US009046923B2

(12) United States Patent
Stallings et al.

(10) Patent No.: US 9,046,923 B2
(45) Date of Patent: Jun. 2, 2015

(54) HAPTIC/VOICE-OVER NAVIGATION ASSISTANCE

(75) Inventors: Heath Stallings, Colleyville, TX (US); Sok Y. Hwang, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1118 days.

(21) Appl. No.: 12/650,806

(22) Filed: Dec. 31, 2009

(65) Prior Publication Data
US 2011/0161810 A1   Jun. 30, 2011

(51) Int. Cl.
*G06F 3/01*   (2006.01)
*G06F 3/0488*   (2013.01)

(52) U.S. Cl.
CPC .............. *G06F 3/016* (2013.01); *G06F 3/0488* (2013.01)

(58) Field of Classification Search
CPC ................................ G06F 3/016; G06F 3/0488
USPC .................................... 345/173; 715/723, 702
See application file for complete search history.

(56) References Cited

U.S. PATENT DOCUMENTS

| 7,089,292 B1* | 8/2006 | Roderick et al. ............... 709/217 |
| 2003/0156119 A1* | 8/2003 | Bonadio ....................... 345/589 |
| 2003/0158734 A1* | 8/2003 | Cruickshank ................. 704/260 |
| 2007/0203685 A1* | 8/2007 | Takano .......................... 703/23 |
| 2008/0300886 A1* | 12/2008 | Patch .......................... 704/275 |
| 2009/0088204 A1* | 4/2009 | Culbert et al. ............. 455/556.1 |
| 2009/0112597 A1* | 4/2009 | Tarrant et al. ................. 704/260 |
| 2009/0167704 A1* | 7/2009 | Terlizzi et al. ................ 345/173 |
| 2010/0045619 A1* | 2/2010 | Birnbaum et al. ............ 345/173 |
| 2010/0082349 A1* | 4/2010 | Bellegarda et al. ........... 704/260 |
| 2011/0191674 A1* | 8/2011 | Rawley et al. ................ 715/702 |

* cited by examiner

*Primary Examiner* — Boris Pesin
*Assistant Examiner* — Angie Badawi (57) ABSTRACT

A method includes displaying a user interface on a touch display, receiving a user input on the touch display, determining whether the user input is associated with a navigational assistance area of the user interface, outputting one or more vibrations, when it is determined that the user input is associated with the navigational assistance area of the user interface, and outputting an auditory navigational cue that corresponds to a name associated with the navigational assistance area, when it is determined that the user input is associated with the navigational assistance area of the user interface.

20 Claims, 9 Drawing Sheets

HAPTIC/VOICE-OVER NAVIGATION ASSISTANCE

BACKGROUND

Touch screens are prevalent in consumer devices, such as, mobile phones, personal digital assistants (PDAs), web browsing devices, and navigational devices. Users are able to navigate and access content stored on consumer devices by performing various gestures, movements, and/or other types of contact with respect to the touch screens.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

As will be described herein, a user device may provide a user with haptic and auditory navigational assistance when the user may be making a selection of content and/or navigating through content. The user device may include a display, which is touch-sensitive, that displays a user interface (e.g., a graphical user interface (GUI), a textual interface, a combination of a GUI and a textual interface) of the user device. The user may select and/or navigate through the user interface based on an interaction with the display.

In one implementation, the haptic navigational assistance may correspond to the user device (or a portion thereof) or the display (or a portion thereof) vibrating. The vibration may be triggered when the user has selected or has touched a portion of the user interface that corresponds to some active area or navigational assistance area of the user interface. For example, the navigational assistance area of a user interface may correspond to an object, an icon, a menu, data, a keypad, or some other area of the user interface that is interactive and/or selectable. Additionally, in one implementation, the auditory navigational assistance may correspond to the user device providing an auditory navigational cue. The auditory navigational cue may be triggered when the user has selected or has touched a portion of the user interface that corresponds to some navigational assistance area of the user interface. In one implementation, the auditory navigational cue may correspond to a voice that states a name and/or some other identifier associated with the navigational assistance area. The combination of haptic navigational assistance and auditory navigational assistance may permit the user to operate the user device without actually seeing the user interface displayed on the display. Additionally, or alternatively, the combination of haptic navigational assistance and auditory navigational assistance may provide reinforcement to the user, with respect to the user's interaction with the user device, even when the user may be seeing the user interface displayed on the display.

Figure 1:
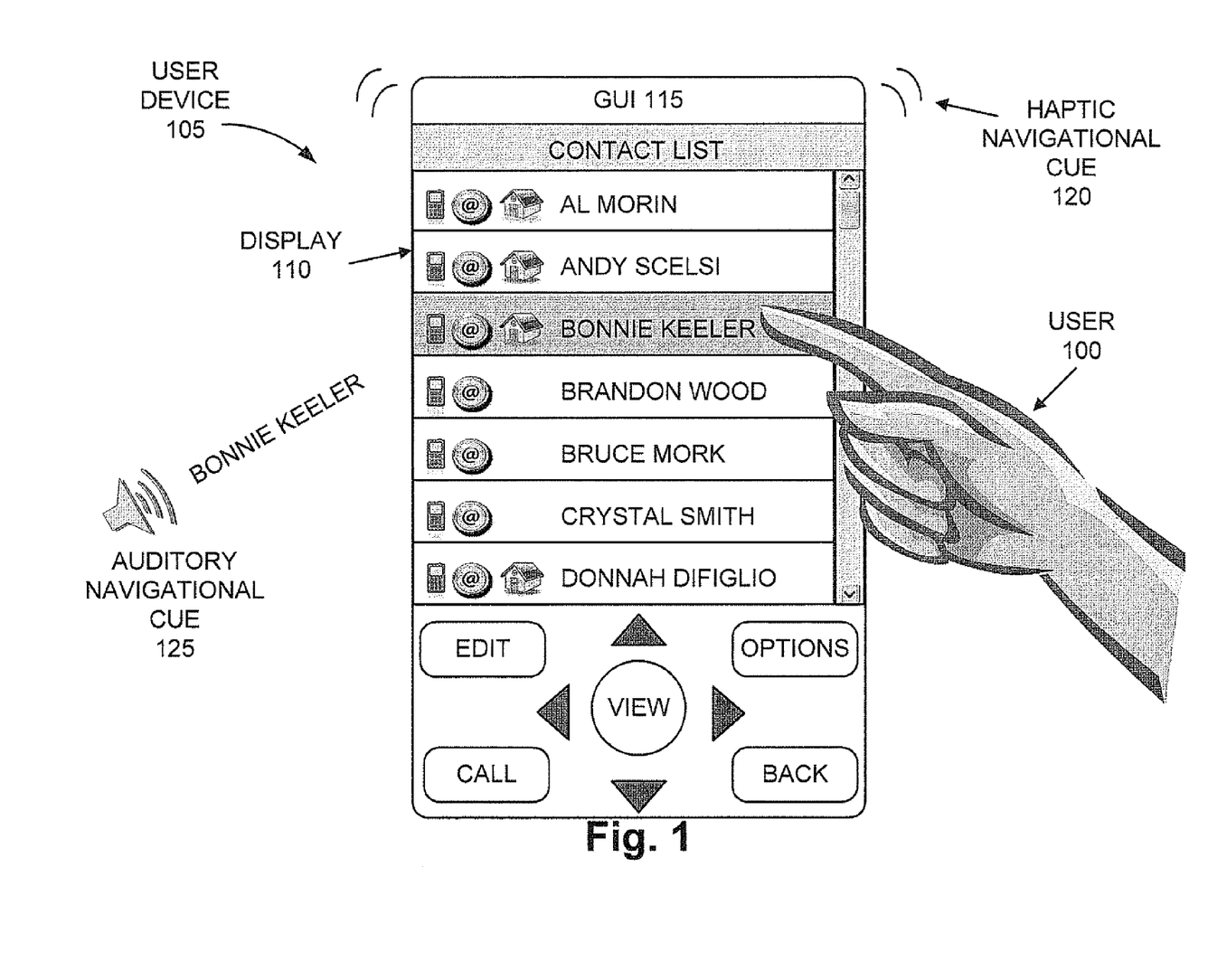
FIG. 1 is a diagram illustrating an exemplary scenario in which a haptic and auditory navigational assistance scheme may be implemented.

FIG. 1 is a diagram illustrating an exemplary scenario in which the haptic and auditory navigational assistance scheme may be implemented. As illustrated, a user 100 may be operating a user device 105 that includes a display 110. Display 110 may include a touch screen. Display 110 may display a GUI 115. In this example, GUI 115 corresponds to a contact list. In one implementation, user 100 may touch a navigational assistance area of GUI 115. In this example, the navigational assistance area of GUI 115 corresponds to a contact (e.g., Bonnie Keeler) from the contact list. Upon user's 100 touching of the contact, user device 105 may provide a haptic navigational cue 120. In this example, haptic navigational cue 120 corresponds to a vibration. Additionally, user device 105 may provide an auditory navigational cue 125. In this example, auditory navigational cue 125 corresponds to the name of a person (i.e., Bonnie Keeler) associated with the contact. The auditory navigational cue 125 may be output to user 100 via a speaker, an earpiece, or headset. User 100 may choose to select this contact or navigate to another contact in the contact list based on haptic navigational cue 120 and auditory navigational cue 125.

As a result of the foregoing, a user may be able to operate a user device without seeing a user interface, which may be displayed on a display, of the user device. Additionally, or alternatively, the user may receive reinforcement, with respect to the user's interaction with the user device, even when the user may be seeing the user interface, which may be displayed on the display, of the user device. Since implementations have been broadly described, variations to the above implementations will be discussed further below.

Figure 2:
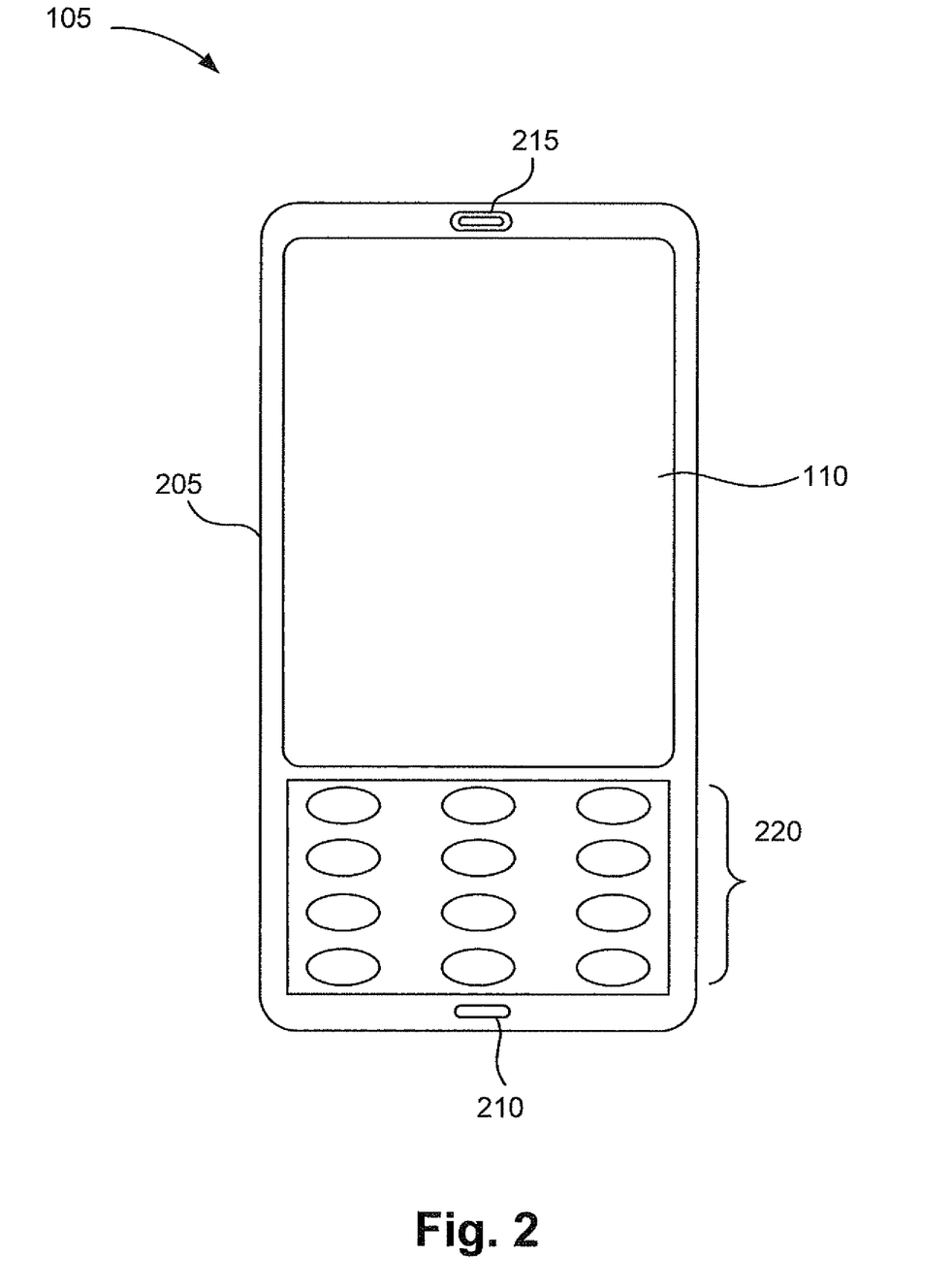
FIG. 2 is a diagram illustrating an exemplary user device.

FIG. 2 is a diagram of an exemplary user device 105 in which the haptic and auditory navigational assistance scheme described herein may be implemented. The term "user device," as used herein, is intended to be broadly interpreted to include a variety of devices (e.g., a consumer device, a medical device, a military device, an entertainment device, etc.). For example, user device 105 may include a portable device, a mobile device, a handheld device, or a stationary device. User device 105 may take the form of a wireless telephone (e.g., a smart phone or a cellular phone), a PDA, a pervasive computing device, a computer (e.g., a desktop computer, a laptop computer, a palmtop computer), an Internet Protocol (IP) phone, a kiosk, a facsimile device, a vending machine, a music playing device, a camera, a video recorder, a web browsing device, a personal navigation device (PDN) (e.g., a Global Positioning System (GPS) navigation device), a multimedia playing device, a vehicle-based device, or some other type of user device (e.g., a remote control for a television or a remote control for some other type of device).

As illustrated in FIG. 2, user device 105 may include a housing 205, a microphone 210, a speaker 215, a keypad 220, and a display 110. In other embodiments, user device 105 may include fewer, additional, and/or different components, and/or a different arrangement of components than those illustrated in FIG. 2 and described herein. For example, user device 105 may include a camera, a video capturing component, and/or a flash for capturing images and/or video. Additionally, or alternatively, user device 105 may not include, for example, microphone 210 and/or keypad 220.

Housing 205 may include a structure to contain components of user device 105. For example, housing 205 may be formed from plastic, metal, or some other material. Housing 205 may support microphone 210, speakers 215, keypad 220, and display 110.

Microphone 210 may transduce a sound wave to a corresponding electrical signal. For example, the user may speak into microphone 210 during a telephone call or to execute a voice command. Speaker 215 may transduce an electrical signal to a corresponding sound wave. For example, the user may listen to music, listen to a calling party, or listen to auditory navigational cue 125 through speaker 215.

Keypad 220 may provide input into user device 105. Keypad 220 may include a standard telephone keypad, a QWERTY keypad, and/or some other type of keypad. Keypad 220 may also include one or more special purpose keys. The user may utilize keypad 220 as an input to user device 105. For example, the user may enter information, such as alphanumeric text, or access some data or invoke some function or operation.

Display 110 may output visual content and may operate as an input component (e.g., a touch screen (also known as a touch display)). Display 110 may be implemented according to a variety of display technologies, including but not limited to, a liquid crystal display (LCD), a plasma display panel (PDP), a field emission display (FED), a thin film transistor (TFT) display, or some other type of display technology. Additionally, display 110 may be implemented according to a variety of sensing technologies, including but not limited to, capacitive sensing, surface acoustic wave sensing, resistive sensing, optical sensing, pressure sensing, infrared sensing, gesture sensing, etc. Display 110 may be implemented as a single-point input device (e.g., capable of sensing a single touch or point of contact) or a multipoint input device (e.g., capable of sensing multiple touches or points of contact that occur at substantially the same time).

Display 110 may also include an auto-rotating function that automatically orients content being displayed in correspondence to an orientation of display 110 and/or user device 105. For example, the auto-rotating function may automatically rotate content in a portrait mode or a landscape mode in correspondence to the orientation of display 110 and/or user device 105.

Display 110 may display text, images, and/or video to the user. Display 110 may also display a user interface (e.g., a GUI) of user device 105. The user may utilize his or her finger or some other instrument (e.g., a stylus) to interact with display 110 (and user device 105).

Figure 3:
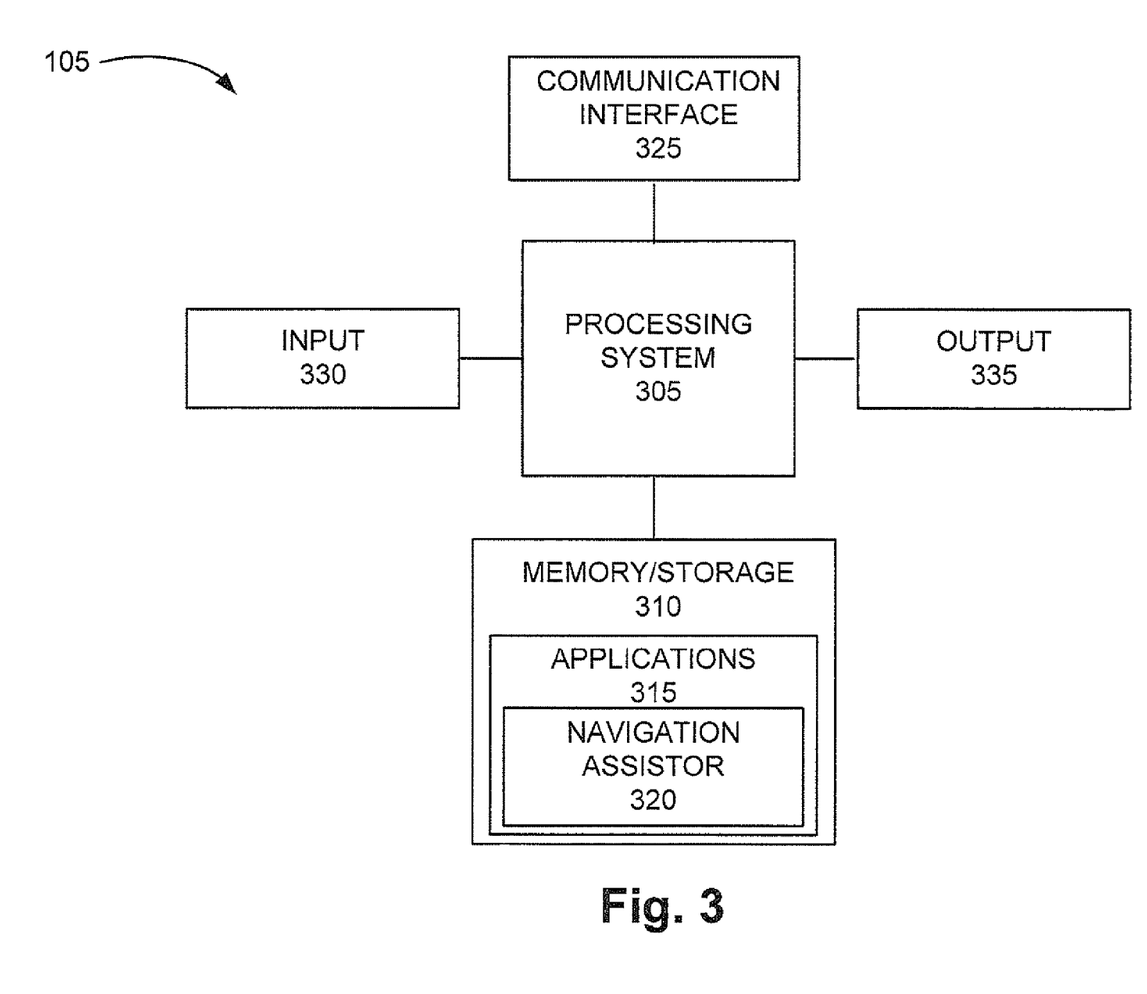
FIG. 3 is a diagram illustrating exemplary components of a user device.

FIG. 3 is a diagram illustrating exemplary components of user device 105. As illustrated, user device 105 may include a processing system 305, memory/storage 310 including applications 315 and navigation assistor 320, a communication interface 325, an input 330, and an output 335. In other implementations, user device 105 may include fewer, additional, and/or different components, and/or a different arrangement of components than those illustrated in FIG. 3 and described herein. For example, user device 105 may not include communication interface 325 and/or secondary storage (e.g., associated with memory/storage 310). Additionally, in other implementations, some functions described as being performed by a particular component may be performed by a different component, or some combination thereof.

Processing system 305 may include one or more processors, microprocessors, data processors, co-processors, network processors, application specific integrated circuits (ASICs), controllers, programmable logic devices (PLDs), chipsets, field programmable gate arrays (FPGAs), and/or some other component that may interpret and/or execute instructions and/or data. Processing system 305 may control the overall operation, or a portion thereof, of user device 105, based on, for example, an operating system (not illustrated) and/or various applications (e.g., applications 315).

Processing system 305 may access instructions from memory/storage 310, from other components of user device 105, and/or from a source external to user device 105 (e.g., a network or another device). Processing system 305 may provide for different operational modes associated with user device 105. Additionally, or alternatively, processing system 305 may simultaneously operate in multiple operational modes.

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices.

Memory/storage 310 may store data, application(s), and/or instructions related to the operation of user device 105. Memory/storage 310 may include a variety of applications 315, such as, for example, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.). In one implementation, applications 315 may include a navigational assistance application associated with navigation assistor 320.

Navigation assistor 320 may provide haptic and auditory navigational assistance to the user based on the user's interaction with the user interface of user device 105, which may be displayed on display 110. In one implementation, navigation assistor 320 may be implemented at an application level. For example, one or more applications 315 may provide haptic and auditory navigational assistance when the user is utilizing and/or interacting with one or more of applications 315. Additionally, or alternatively, navigation assistor 320 may be implemented at a system level (e.g., in an operating system (OS)). For example, a plug-in may be utilized to implement the functionality associated with navigation assistor 320.

Navigation assistor 320 may be implemented by a combination of hardware (e.g., processing system 305, memory/storage 310, input 330, and/or output 335) and software (e.g., applications 315). Navigation assistor 320 will be described in greater detail below.

Communication interface 325 may permit user device 105 to communicate with other devices, networks, and/or systems. For example, communication interface 325 may include a cable interface, a fiber optic interface, a radio interface, or some other type of wireless and/or wired interface.

Input 330 may permit the user and/or another device to input information into user device 105. For example, input 330 may include a button (e.g., keypad 220), a knob, a touchpad, an input port, a display (e.g., display 110), microphone 210, voice recognition logic, fingerprint recognition logic, retinal scan logic, a web cam, and/or some other type of input component. Output 335 may permit user device 105 to output information to the user and/or another device. For example, output 335 may include a display (e.g., display 110), light emitting diodes (LEDs), an output port, speaker 215, and/or some type of output component. In one implementation, output 335 may include a vibration mechanism to provide haptic navigational assistance. Additionally, in one implementation, output 335 may include an audio generator to provide auditory navigational assistance. Haptic and auditory navigational assistance will be described in greater detail below with respect to navigation assistor 320.

As described herein, user device 105 may perform certain operations in response to processing system 305 executing software instructions contained in a computer-readable medium, such as memory/storage 310. The software instructions may be read into memory/storage 310 from another computer-readable medium or from another device via communication interface 325. The software instructions contained in memory/storage 310 may cause processing system 305 to perform processes described herein. Alternatively, hardwired circuitry may be used in place of or in combination with software instructions to implement processes described herein. Thus, implementations described herein are not limited to any specific combination of hardware circuitry and software.

As previously described, user device 105 may include navigation assistor 320. Navigation assistor 320 may provide haptic and auditory navigational assistance to the user based on the user's interaction with the user interface of user device 105, which may be displayed on display 110. Described below are exemplary functional components that provide for haptic and auditory navigational assistance.

Figure 4:
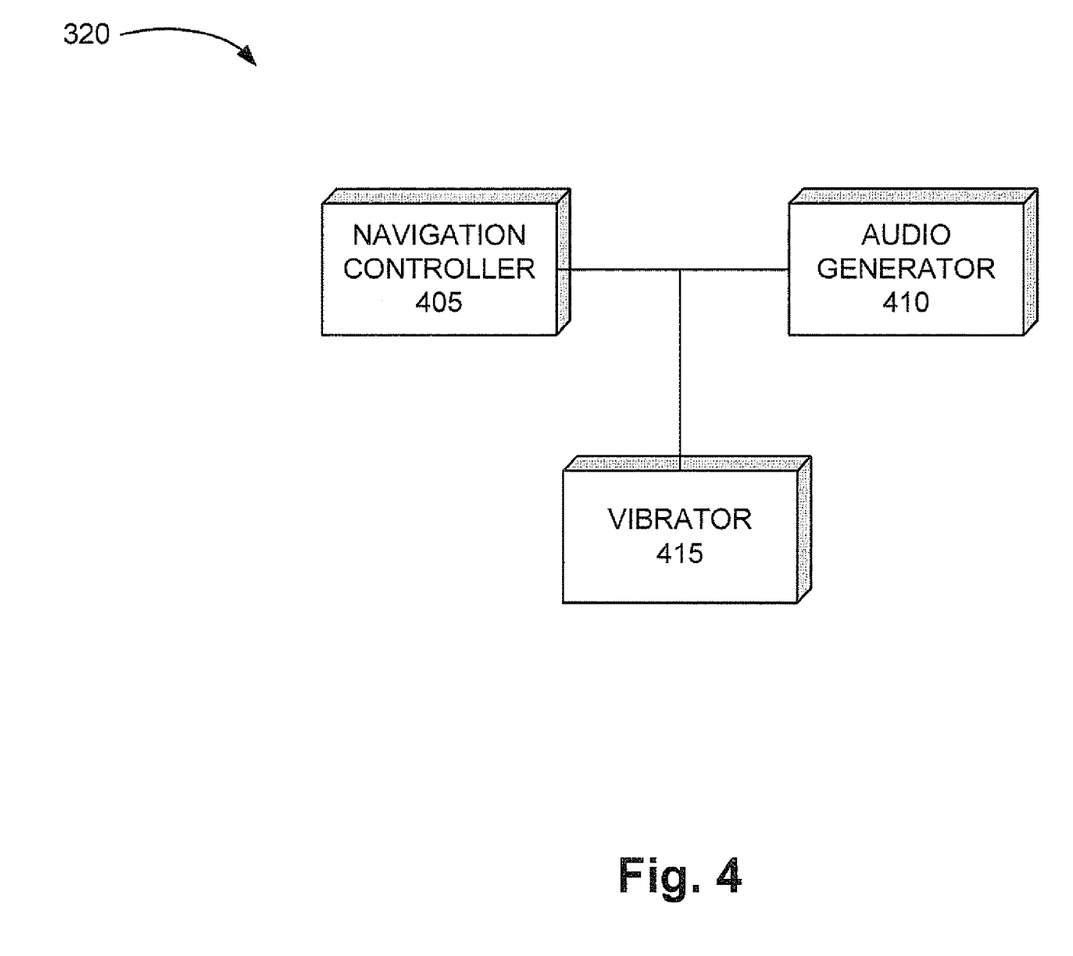
FIG. 4 is a diagram illustrating exemplary functional components of a navigation assistor.

FIG. 4 is a diagram illustrating exemplary functional components of navigation assistor 320. As illustrated in FIG. 4, navigation assistor 320 may include a navigation controller 405, an audio generator 410, and a vibrator 415. In one implementation, navigation controller 405, audio generator 410, and/or vibrator 415 may be implemented as a combination of hardware and software. In other implementations, navigation controller 405, audio generator 410, and/or vibrator 415 may be implemented in hardware.

Navigation controller 405 may determine and/or detect when the user has interacted with a navigational assistance area of a user interface displayed on display 110. As previously described, the navigational assistance area of the user interface may correspond to, for example, an object, an icon, a menu, data, a keypad, or some other area of the GUI that is interactive and/or selectable. Upon such detection, navigation controller 405 may retrieve name or identifier information associated with a file or data from which the navigational assistance area of the user interface is based. For example, a folder may be named "Pictures." Navigation controller 405 may obtain the name "Pictures" from a directory named "Pictures." In one implementation, navigation controller 405 may output an audio command to audio generator 410 to generate auditory navigational cue 125 that corresponds to the name "Pictures." Additionally, navigation controller 405 may output a vibrate command to vibrator 415 to generate haptic navigational cue 120.

It will be appreciated that more sophisticated auditory navigational cues 125 may be formulated based on name or identifier information associated with a file or data from which the navigational assistance area of the user interface is based. For example, assume that the user selects a picture named "Gladys." Navigation controller 405 may recognize that the picture (i.e., the file) is in the Picture folder. Additionally, or alternatively, navigation controller 405 may recognize the type of file. For example, in this example, the picture may correspond to a file type such as jpg, bitmap, or some other type of image file. Based on the name of the folder (or path information) and/or file type information, navigation controller 405 may provide an audio command to audio generator 410 to generate auditory navigational cue 125 that corresponds to "Picture of Gladys" or "Photo of Gladys." In this way, navigational controller 405 may not necessarily be limited to the exact name or exact identifier associated with the file (e.g., "Gladys) as the designated auditory navigational cue 125. Rather, navigational controller 405 may formulate auditory navigational cue 125 based on other information.

Audio generator 410 may generate an auditory navigational cue signal based on the audio command provided by navigation controller 405. In one implementation, the auditory navigational cue signal may correspond to a vocalization of the name or formulated name associated with the navigational assistance area. For example, in one implementation, audio generator 410 may include a text-to-speech component that provides a synthetic voice to vocalize the name or formulated name associated with the navigational assistance area.

Vibrator 415 may cause user device 105 (or a portion thereof) or display 110 (or a portion thereof) to vibrate. In one implementation, the magnitude and the duration of the vibration may be parameters that are user-configurable. The vibration may stop when contact with display 110 is broken. Additionally, the vibration may stop when a point of contact with display 110 no longer corresponds to a navigational assistance area. In one implementation, the vibration may be localized to a region of display 110 in which the user input is received. In this way, it may be more probable that the user may perceive the vibration.

Although FIG. 4 illustrates exemplary functional components of navigation assistor 320, in other implementations, navigation assistor 320 may include additional, fewer, different, and/or differently arranged functional components than those illustrated in FIG. 4 and described herein. Additionally, or alternatively, one or more operations described as being performed by a particular component may be performed by one or more other components, in addition to or instead of the particular component.

Figure 5A:
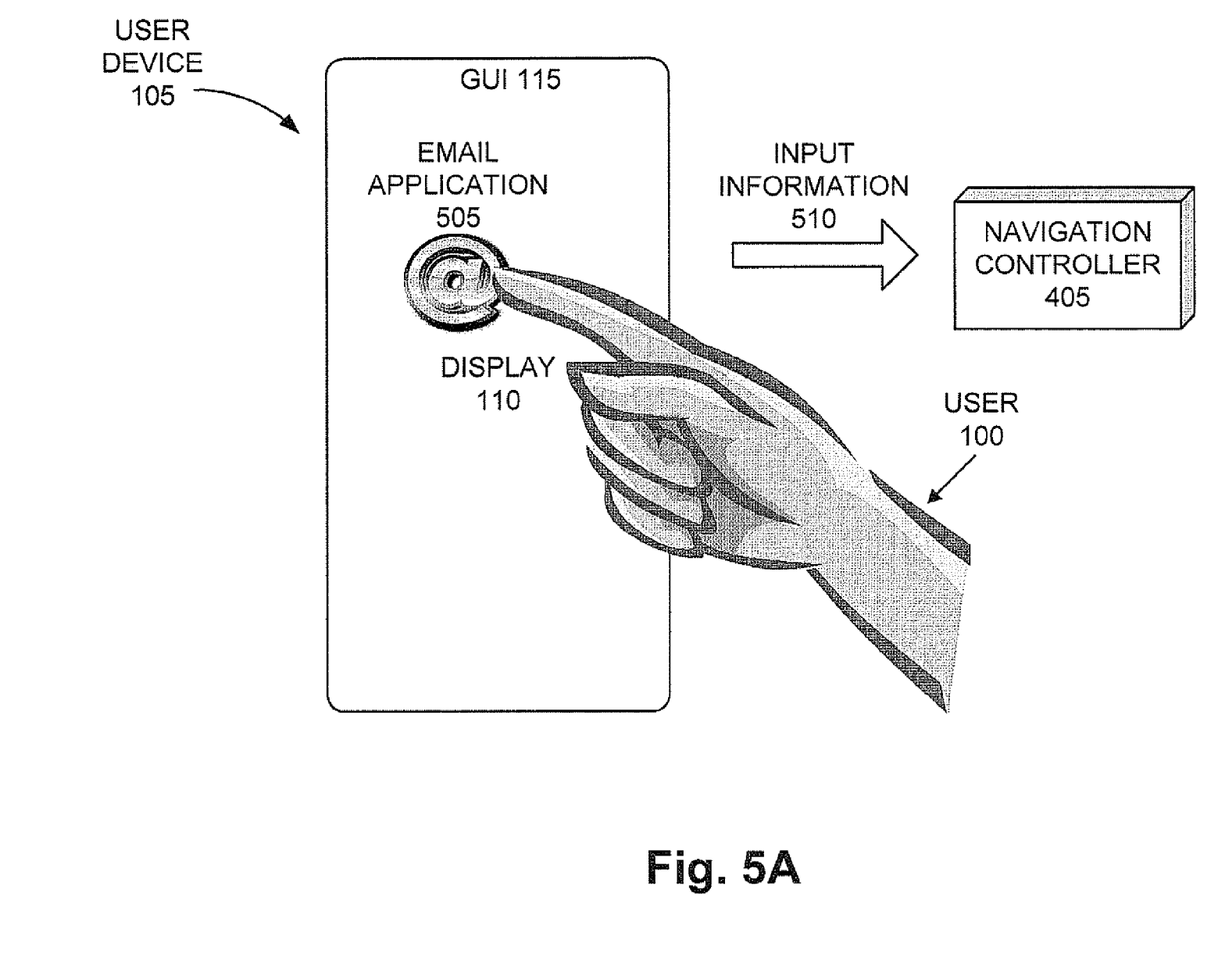
FIGS. 5A-5C are diagrams illustrating exemplary operations performed by the navigation assistor to provide haptic and auditory navigational assistance.
Figure 5B:
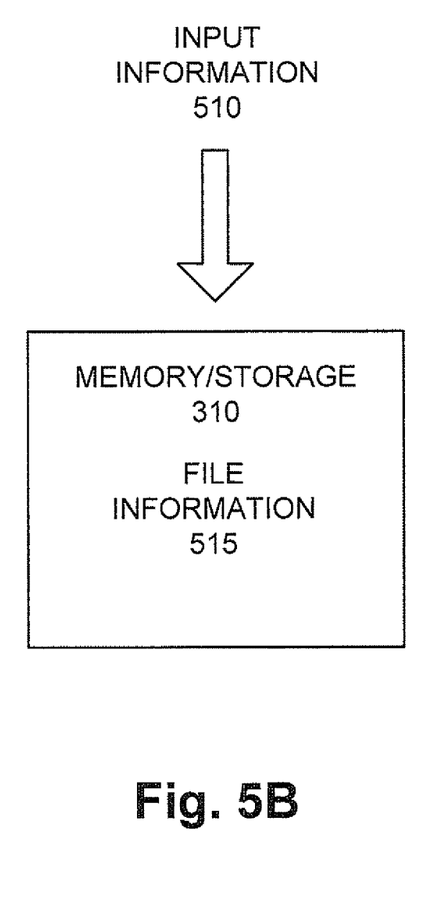
Figure 5C:
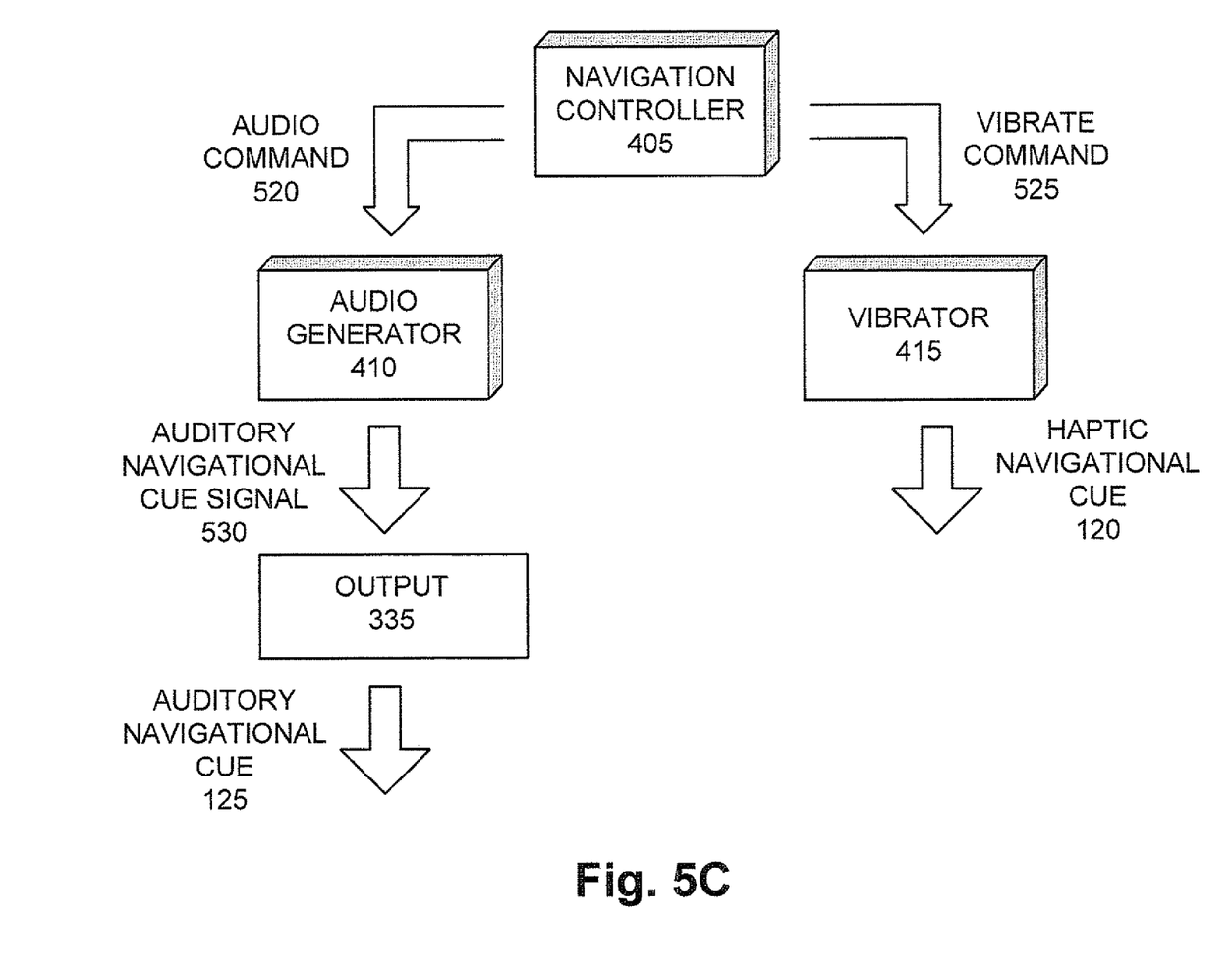

FIGS. 5A-5C are diagrams illustrating exemplary operations performed by navigation assistor 320 to provide haptic and auditory navigational assistance to the user. For example, the exemplary operations may be performed by navigation controller 405, audio generator 415, and vibrator 415.

Referring to FIG. 5A, assume user 100 is interacting with display 110 of user device 105, and selects an icon corresponding to an email application 505. In correspondence to the selection of email application 505, input information 510 may be provided to navigation controller 405. For example, as illustrated in FIG. 5B, input information 510 may include or correspond to file information 515 (e.g., a name of the file of email application 505 or path information (e.g., programs/email application.exe)).

Referring to FIG. 5C, based on input information 510, navigation controller 405 may generate an audio command 520 and a vibrate command 525. Audio command 520 may include a name, an identifier, or a formulation thereof, of input information 510. Vibrate command 525 may instruct vibrator 415 to vibrate. Navigation controller 405 may output audio command 520 and vibrate command 525 to audio generator 410 and vibrator 415, respectively.

Audio generator 410 may generate an auditory navigational cue signal 530 (e.g., an audio signal) based on audio command 520. Auditory navigation cue signal 520 may correspond to a vocalization of audio command 520. In this example, auditory navigational cue signal 530 may correspond to "Email application" or "Email program."

As further illustrated in FIG. 5C, audio generator 410 may output auditory navigational cue signal 530 to output 335. For example, output 335 may correspond to speaker 215 or an earpiece or headset (not illustrated). The output from output 335 may correspond to auditory navigational cue 125. Additionally, vibrator 415 may output haptic navigational cue 120 based on vibrate command 525.

Although FIGS. 5A-5C illustrate exemplary operations associated with navigation assistor 320, in other implementations, additional, fewer, and/or different operations may be performed other than those described and illustrated in FIGS. 5A-5C.

Figure 6A:
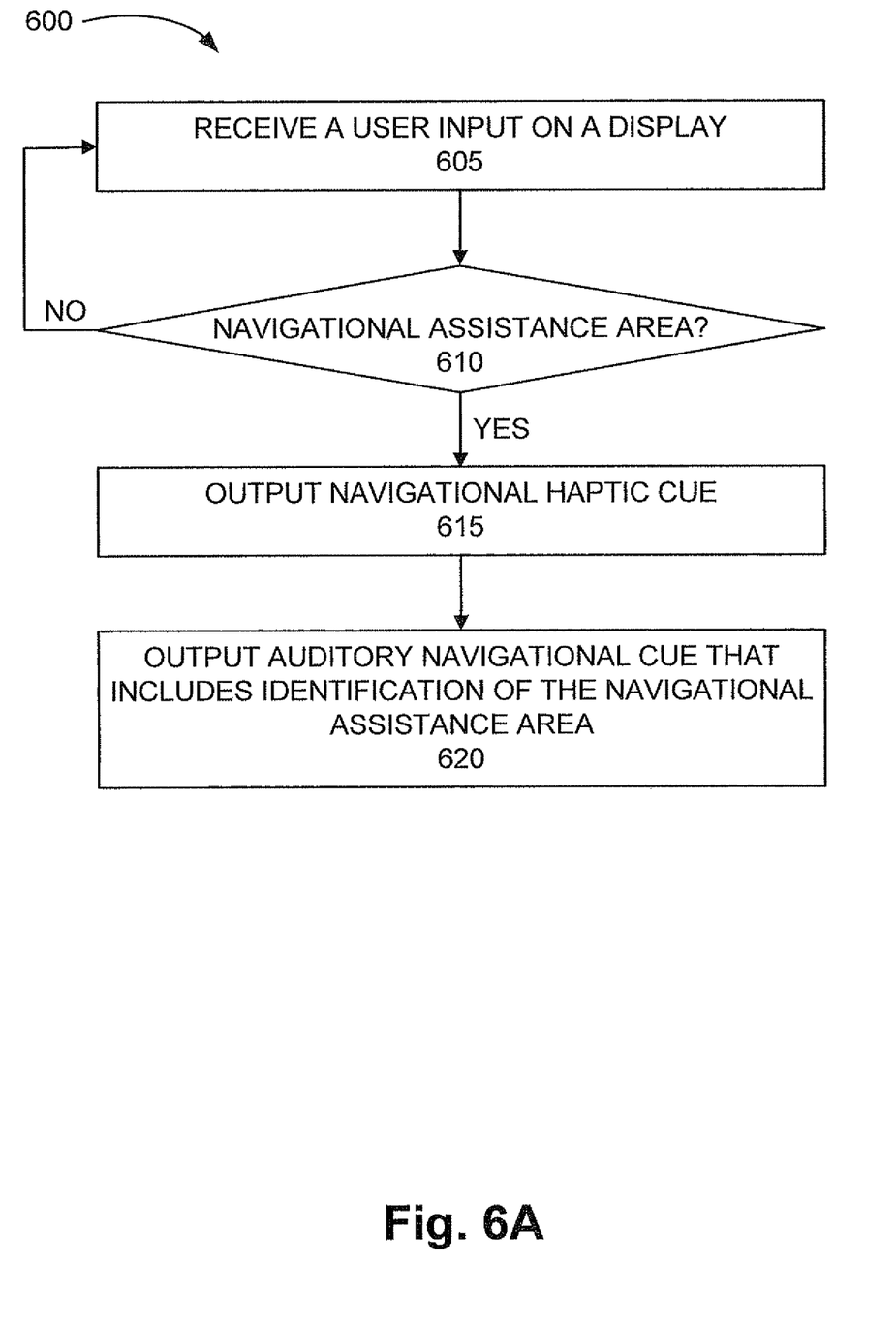
FIGS. 6A and 6B illustrate flow diagrams of exemplary processes for providing haptic and auditory navigational assistance.
Figure 6B:
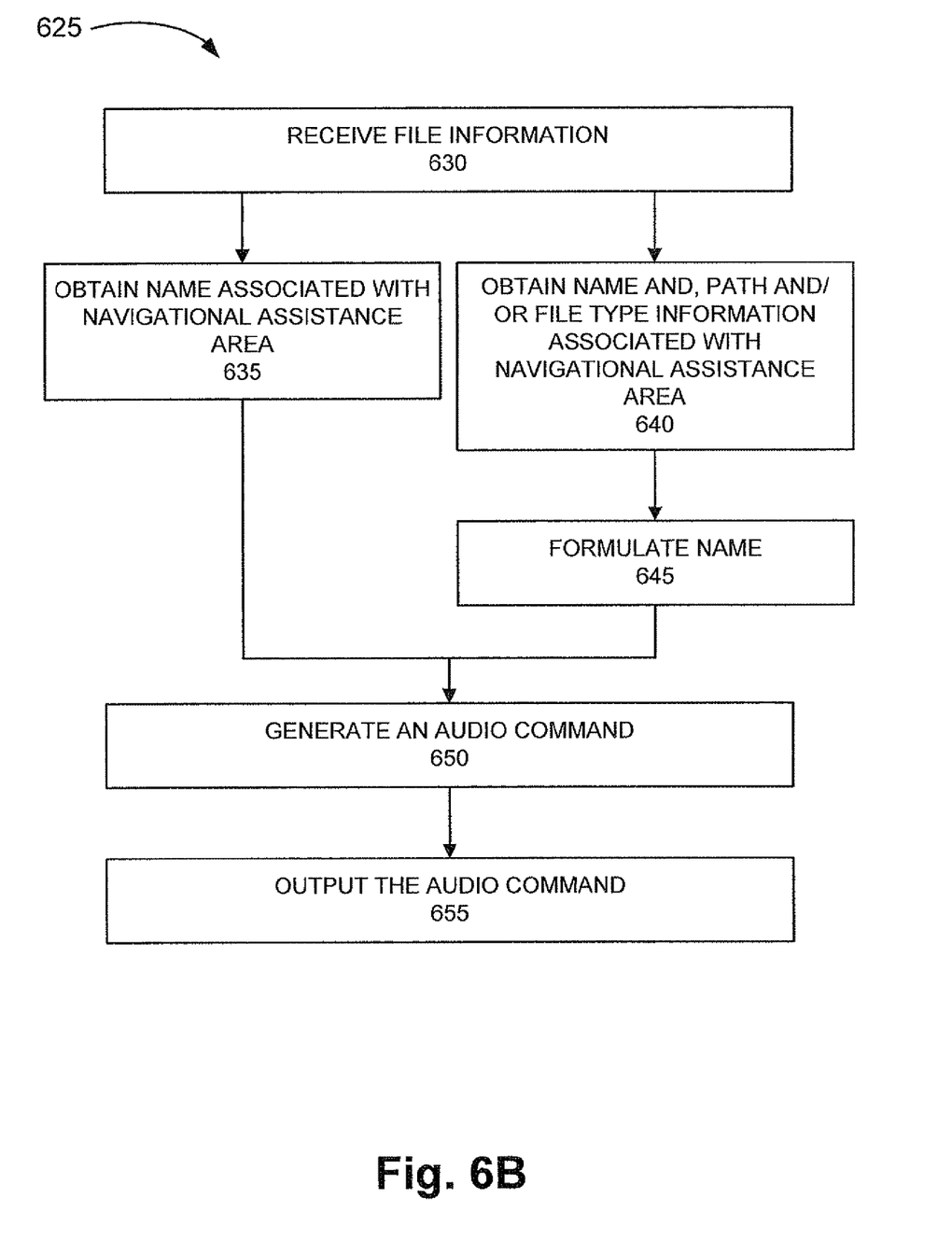

FIGS. 6A and 6B illustrate flow diagrams of an exemplary process 600 for providing haptic and auditory navigational assistance. Process 600 may be performed by user device 105.

Process 600 may include receiving a user input on a display (block 605). For example, as previously described, user 100 may interact with a user interface (e.g., GUI 115) displayed on display 110. Display 110 may include a touch screen. User 100 may touch an area of display 110 using, for example, his or her finger or an instrument (e.g., a stylus). In one implementation, input information 510 may be provided to navigation controller 405.

It may be determined whether the user input is associated with a navigational assistance area (block 610). User 100 may touch various portions of the user interface, some of which may correspond to a navigational assistance area and some of which may not correspond to a navigational assistance area. As previously described, the navigational assistance area of a GUI may correspond to an object, an icon, a menu, data, a keypad, or some other area of the GUI that is interactive and/or selectable. For example, on a desktop GUI, there may be icons or other objects that may be interactive or selectable. In such an instance, the icons or other objects may each be considered a navigational assistance area. In contrast, the space between icons dispersed on the desktop GUI may not be considered navigational assistance areas. Similarly, an application GUI may include navigational assistance areas and non-navigational assistance areas.

In one implementation, navigation controller 405 may determine and/or detect when input information 510 corresponds to a navigational assistance area or a non-navigational assistance area. For example, on an application level and/or on a system level of user device 105, navigational assistance areas may be recognizable. This type of information may be provided with input information 510. Alternatively, in another implementation, navigation controller 405 may only receive input information 510 when the area associated with the user interface corresponds to a navigational assistance area.

If it is determined that the user input is not associated with the navigational assistance area (block 610-NO), process 600 may return to block 605. For example, display 110 may continue to receive user inputs from user 100 as user 100 navigates and/or selects content associated with the user interface.

If it is determined that the user input is associated with the navigational assistance area (block 610-YES), a navigational haptic cue may be output (block 615) and an auditory navigational cue that includes identification of the navigational assistance area may be output (block 620). For example, as previously described, vibrator 415 may output a vibration corresponding to haptic navigational cue 120, and output 335 (e.g., speaker 215, or an earpiece, or headset) may output auditory navigational cue 125. For example, auditory navigational cue 125 may include a vocalization of a name, an identifier, or a formulated name associated with the navigational assistance area.

Although FIG. 6A illustrates an exemplary process 600, in other implementations, additional, fewer, and/or different operations than those described, may be performed.

FIG. 6B is a flow diagram illustrating an exemplary process 625 for generating and outputting the auditory navigational cue. Process 625 may be performed on user device 105.

Process 625 may include receiving file information (block 630). For example, as previously described, with respect to FIG. 5B and elsewhere in this description, navigation controller 405 may receive input information 510. Input information 510 may include or correspond to file information 515. File information 515 may include a name of a file associated with the navigational assistance area, path information associated with the navigational assistance area, and/or a file type associated with the navigational assistance area. Navigation controller 405 may receive file information 515.

A name associated with the navigational assistance area may be obtained (block 635). For example, in one implementation, navigation controller 405 may obtain a name or an identifier associated with the navigational assistance area based on file information 515. In one implementation, navigation controller 405 may parse file information 515 to extract the name or the identifier. Alternatively, as illustrated by (block 640), a name and path and/or a file type associated with the navigational assistance area may be obtained. Similarly, navigation controller 405 may obtain name and, path and/or file type information associated with the navigational assistance area based on file information 515. In one implementation, navigation controller 405 may parse file information to extract name and path, name and file type, or name, path and file type information from file information 515.

A name may be formulated (block 645). For example, as previously described, navigation controller 405 may formulate a name or an identifier associated with the navigational assistance area based on name and, path and/or file type information. In some instances, navigation controller 405 may add words not specifically found in file information 515. For example, in a name corresponding to "Picture of Gladys," the word "of" (and maybe Picture) may not be found in file information 515. In such an instance, navigation controller 405 may inject connectors (e.g., of, in, and, etc.) between words that may be found in file information 515 (e.g., "Pictures" found in path information, which may be shortened to "Picture", or "Picture" from file type information (e.g., .jpg or the like) and "Gladys" as name of file).

An audio command may be generated (block 650). For example, as previously described with respect to FIG. 5C and elsewhere in this description, navigation controller 405 may generate an audio command 520. Audio command 520 may include the name to be vocalized as auditory navigational cue 125.

The audio command may be output (block 655). For example, as previously described with respect to FIG. 5C and elsewhere in this description, navigation controller 405 may output audio command 520 to audio generator 410. Audio generator 410 may generate an auditory navigational cue signal 530 to be output via, for example, speaker 215, an earpiece, or a headset. This output may correspond to auditory navigational cue 125, which includes identification of the navigational assistance area.

Although FIG. 6B illustrates an exemplary process 625, in other implementations, additional, fewer, and/or different operations than those described, may be performed.

The foregoing description of implementations provides illustration, but is not intended to be exhaustive or to limit the implementations to the precise form disclosed. Accordingly, modifications to the embodiments, implementations, etc., described herein may be possible.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 6A and 6B, the order of the blocks may be modified in other implementations. Further, non-dependent blocks may be performed in parallel.

It will be apparent that the device described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of the device was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   displaying, by a user device that includes a touch display, a user interface;
   receiving, by the user device, a user input on the touch display and in a first area of the user interface;
   determining, by the user device, whether the user input in the first area is included in a second area of the user interface;
   determining, by the user device, a type of a file associated with the first area;
   formulating, by the user device, a name of the file based on the type of the file and path information associated with the file;
   generating, by the user device, audio based on the type of the file and the path information associated with the file;
   outputting, by the user device, one or more vibrations in response to determining that the user input is included in the second area of the user interface; and
   outputting, by the user device, the audio that includes a vocalization of the name of the file associated with the first area in response to determining that the user input is included in the second area of the user interface.

2. The method of claim 1, wherein the first area corresponds to an interactive area of the user interface.

3. The method of claim 1, further comprising:
   receiving file information that corresponds to the first area of the user interface.

4. The method of claim 3, wherein the file information includes the path information and the type of file.

5. The method of claim 1, further comprising:
   obtaining file information associated with the first area; and
   parsing the file information to extract the path information and the type of the file.

6. The method of claim 5, wherein the audio includes a vocalization of a word that is not included in the file information, and wherein the word is in addition to the name of the file.

7. The method of claim 1, wherein the user interface includes a graphical user interface, and wherein the first area corresponds to one of an icon, an object, a keypad, or a selectable item associated with a software application.

8. The method of claim 1, further comprising:
   receiving another user input on the touch display;
   determining that the other user input is not included in the second area of the user interface; and
   omitting to output audio and one or more vibrations in response to determining that the other user input is not included in the second area of the user interface.

9. A device comprising:
   a touch display; and
   one or more processors to:
      display a user interface on the touch display;
      detect a user input on the touch display and in a first area of the user interface;
      determine whether the user input in the first area is included in a second area of the user interface;
      determine a type of a file associated with the first area;
      formulate a name of the file based on the type of the file and path information associated with the file;
      generate audio based on the type of the file and the path information associated with the file;
      output one or more vibrations in response to a determination that the user input is included in the second area of the user interface; and
      output the audio that includes a vocalization of the name of the file associated with the first area in response to a determination that the user input is included in the second area of the user interface.

10. The device of claim 9, where the device comprises one or more of:
   a telephone,
   a personal digital assistant,
   a personal computer, or
   a multimedia playing device.

11. The device of claim 9, where the one or more processors are to:
   receive file information associated with the first area, and
   obtain the name of the file based on the file information.

12. The device of claim 9, wherein the first area corresponds to an interactive area of the user interface.

13. The device of claim 9, wherein the audio further includes a vocalization of a word that is not included in file information associated with the file.

14. The device of claim 9, wherein the vibration occurs only in an area of the touch display corresponding to the first area.

15. The device of claim 9, further comprising:
a speaker,
the audio being output via the speaker or another device.

16. A non-transitory computer-readable medium comprising:
instructions that, when executed by at least one processor, cause the at least one processor to:
detect a user input in a first area of a user interface displayed by a touch screen;
determine whether the user input in the first area is included in a second area of the user interface;
determine a type of a file associated with the first area;
formulate a name of the file based on the type of the file and path information associated with the file;
generate audio based on the type of the file and the path information associated with the file;
output one or more vibrations in response to a determination that the user input is included in the second area of the user interface; and
output the audio that includes a vocalization of the name of the file associated with the first area in response to a determination that the user input is included in the second area of the user interface.

17. The non-transitory computer-readable medium of claim 16, further comprising:
one or more instructions that, when executed by the at least one processor, cause the at least one processor to:
receive file information associated with the first area; and
generate the name of the file based on the file information.

18. The non-transitory computer-readable medium of claim 17, wherein the file information includes the path information associated with the file and the type of the file.

19. The non-transitory computer-readable medium of claim 16, wherein the user interface includes a graphical user interface, and wherein the first area corresponds to one of an icon, an object, a keypad, or a selectable item associated with a software application.

20. The method of claim 1, wherein formulating the name of the file comprises:
selecting an original name of the file associated with the first area;
selecting a word that is based on the type of the file;
selecting a connector word; and
formulating the name of the file based on the original name of the file, the word, and the connector word.

* * * * *